May 5, 1959            N. A. SCHUSTER            2,885,632

APPARATUS FOR ELECTRICAL WELL LOGGING

Filed Aug. 27, 1956            3 Sheets-Sheet 1

*INVENTOR.*
NICK A. SCHUSTER
BY *William L. Sherman*
HIS ATTORNEY

May 5, 1959 N. A. SCHUSTER 2,885,632
APPARATUS FOR ELECTRICAL WELL LOGGING
Filed Aug. 27, 1956 3 Sheets-Sheet 2

INVENTOR.
NICK A. SCHUSTER
BY
HIS ATTORNEY

May 5, 1959  N. A. SCHUSTER  2,885,632
APPARATUS FOR ELECTRICAL WELL LOGGING
Filed Aug. 27, 1956  3 Sheets-Sheet 3

INVENTOR.
NICK A. SCHUSTER
BY *William P. Sherman*
HIS ATTORNEY

United States Patent Office 2,885,632
Patented May 5, 1959

2,885,632
APPARATUS FOR ELECTRICAL WELL LOGGING

Nick A. Schuster, Houston, Tex., assignor, by mesne assignments, to Schlumberger Well Surveying Corporation, Houston, Tex., a corporation of Texas Application August 27, 1956, Serial No. 606,302

10 Claims. (Cl. 324—1)

The present invention relates to the electrical investigation of earth formations traversed by a borehole and more particularly to improved apparatus for deriving signals representative of the resistivity of earth formations adjacent to an electrical logging array which is passed through the borehole.

It has become accepted practice to obtain electrical resistivity logs of earth formations by well logging systems which automatically control potential and current distributions in the vicinity of an electrode array to derive resistivity indications having a desired significance. Exemplary systems of this type are disclosed in Doll Patent Nos. 2,712,627, 2,712,628, 2,712,629 and 2,712,630, as well as in Ferre Patent No. 2,712,631, all issued on July 5, 1955. In these systems, a regulated survey current is emitted from a main electrode in the borehole and is confined to a path extending transversely to the borehole wall by auxiliary current passed from an auxiliary electrode having portions spaced on opposite sides of the main electrode. The auxiliary current is supplied by feedback amplifier means responsive to the potential difference between a pair of spaced points, one of which is nearer the main electrode. To reduce the potential difference substantially to zero, the auxiliary current is emitted in phase with the survey current passing from the main electrode.

It is an object of the present invention to provide new and improved apparatus of the above character in which the gain requirements of the feedback amplifier means are reduced without sacrifice of accuracy to enhance stability of operation under extreme borehole conditions.

Another object of the invention is to provide new and improved apparatus of the above character, which is arranged for a higher signal-to-noise ratio in the feedback loop.

These and other objects are obtained, in accordance with the invention, by incorporating in an electrical well logging system a measuring circuit which is polarized at a given phase angle $\phi$ and serves to derive resistivity signals proportional to the potential difference produced between a point in the vicinity of the main electrode in the borehole and a remote reference point. This potential difference is established by passing survey current from the main electrode at a reference phase angle and passing an auxiliary current from an auxiliary electrode which includes portions spaced above and below the main electrode. The auxiliary current is derived from a feedback loop circuit including an amplifier having its input connected to a pair of spaced points for response to the potential difference therebetween produced by the main and auxiliary currents. A fixed phase shift $\theta$ between the latter potential difference and the auxiliary current emitted in response to it is developed to reduce the requirements of amplifier gain for a given accuracy of resistivity measurements. In one form of the invention, the phase shift $\theta$ is developed in the feedback amplifier. In another form, a phase shifting circuit is interposed between the amplifier and the auxiliary electrode. Representative electrode arrays suitably employed with the invention are shown in the several embodiments.

The invention will be more fully understood from the following detailed description taken in conjunction with the drawings, in which.

Figure 1:
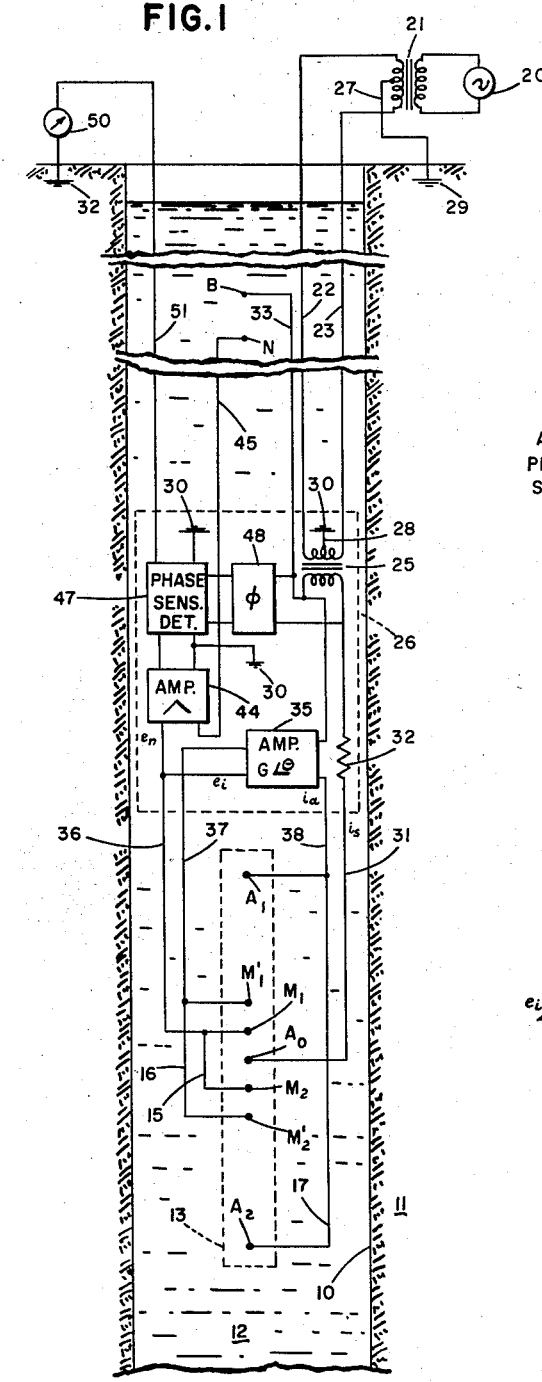
Fig. 1 is a schematic diagram of a well logging system arranged in accordance with the invention.

In Fig. 1 there is shown a borehole 10 traversing earth formations 11 and containing a column 12 of electrically conductive weighting fluid, such as a suitable drilling mud. To investigate the formations 11 lying behind the borehole wall, an electrode array 13 is lowered by means of an electrical cable (not shown) from the surface into a borehole for movement past the formations at a desired speed.

Electrode array 13 is of the type disclosed in the aforementioned H. G. Doll Patent No. 2,712,627, and has a generally elongated form to extend longitudinally of the borehole. The array comprises a central, main current electrode $A_0$, a pair of measuring electrodes $M_1$, $M_1'$ spaced different distances above the main electrode, a pair of measuring electrodes $M_2$, $M_2'$ spaced symmetrically below the main electrode, and auxiliary electrodes $A_1$ and $A_2$ spaced symmetrically above and below the main electrode. The measuring electrodes $M_1$, $M_1'$ and $M_2$, $M_2'$ are thus spaced intermediate the main and auxiliary current electrodes. If desired, one of the pair of measuring electrodes may be omitted. However, in a preferred arrangement, symmetry of the potential and current distributions about the main electrode $A_0$ is promoted by connectors 15, 16 and 17 serving substantially to equalize the potentials of electrodes $M_1$ and $M_2$, of electrodes $M_1'$ and $M_2'$, and of electrodes $A_1$ and $A_2$, respectively. The connected electrodes may thus be considered as spaced portions of a single electrode.

The survey current to be passed from the main electrode $A_0$ is derived from a suitable electric source which may comprise an alternating current generator 20 at the earth's surface coupled through transformer 21 and cable conductors 22, 23 to a transformer 25 disposed within a fluid tight housing 26. Cable conductors 22 and 23 also provide a balanced phantom return circuit through midtaps 27 and 28 grounded at 29 and 30 respectively. The secondary winding of transformer 25 is connected by insulated conductor 31 through a resistor 32 to the main electrode $A_0$ and by an insulated conductor 33 to a remote current return electrode B. In a practical application, the current return point B may be an exposed, uninsulated section of cable armor spaced above the housing 26 by a sufficient length of insulated cable, for example, 75 feet. Thus, electrode B is remote in the sense that potential and current distributions in the vicinity of the main electrode are substantially the same as would be obtained with an infinitely remote current return point. To regulate at substantially a constant value the magnitude of survey current flowing from the main electrode $A_0$ to the current return electrode B, the resistance of resistor 32 is preferably well in excess of any formation resistance which may be encountered between the electrodes $A_0$ and B.

Figure 3:
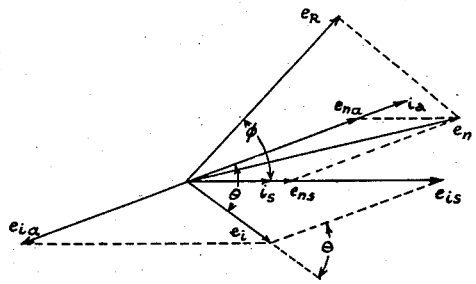
Fig. 3 is a vector diagram representing exemplary phase and amplitude relationships occurring in the operation of the system of Fig. 1.

To control the distribution of current and potential about the main electrode $A_0$, a feedback circuit including amplifier 35 is provided for introducing auxiliary current from the auxiliary electrodes $A_1, A_2$. It may be observed that flow of survey current from the main electrode $A_0$ produces a potential difference between the measuring electrodes $M_1, M_1'$ (as well as between measuring electrodes $M_2, M_2'$) in phase with the survey current. This potential difference may be referred to as the inverse signal $e_{is}$ due to the survey current. Correspondingly, the flow of auxiliary current from the auxiliary electrodes $A_1, A_2$ produces a potential difference between measuring electrodes $M_1, M_1'$ which may be referred to as the inverse signal $e_{ia}$. Because the auxiliary current is emitted on the opposite side of the measuring electrodes $M_1, M_1'$ from the survey current, however, the inverse signal $e_{ia}$ due to the auxiliary current may be considered 180° out of phase with the auxiliary current for a consistent representation of the phase relationships. As seen in Fig. 3, the inverse signal $e_{is}$ is in phase with the survey current $i_s$, while the inverse signal $e_{ia}$ is represented by a vector displaced 180° from the vector $i_a$, representing the auxiliary current. The vector sum of the inverse signals $e_{ia}$ and $e_{is}$ is a resultant inverse signal $e_i$ which corresponds to the potential difference produced between measuring electrodes $M_1, M_1'$.

To adjust the value of the auxiliary current in response to the resultant inverse signal $E_i$, the feedback amplifier 35 has its input terminals connected by insulated conductors 36, 37 to measuring electrodes $M_1, M_1'$, respectively, and its output terminals connected by insulated conductor 38 to auxiliary electrodes $A_1, A_2$ and by conductor 33 to remote current return electrode B. Amplifier 35 is of any suitable design providing a high gain G and a phase shift between its input and output terminals through the phase angle $\theta$. This phase shift $\theta$ is, in accordance with the principles of the invention, a fixed value predetermined to minimize the gain requirements of the feedback amplifier 35. In an exemplary form of the invention, the phase angle $\theta$ may be 65°, although phase shifts ranging anywhere from about 30° to 130° may suitably be employed. In Fig. 3, the phase angle $\theta$ is seen to represent the phase lead of the auxiliary current $i_a$ with reference to the resultant inverse signal $e_i$. A positive phase angle is thus taken to represent a leading phase relationship, although an opposite convention may be adopted without departure from the principles of the invention.

Figure 2A:
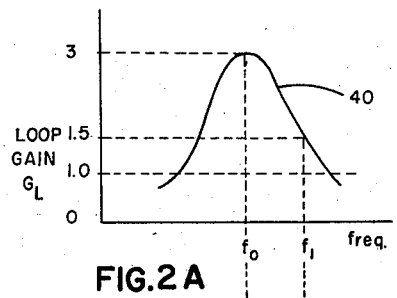
Figs. 2A and 2B are graphical representations, respectively, of variations in feedback loop gain and in amplifier phase shift with frequency.
Figure 2B:
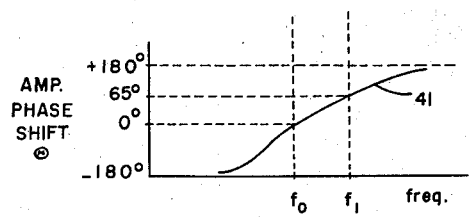

The desired phase shift $\theta$ may conveniently be obtained where amplifier 35 incorporates tuning circuits for coupling the stages, by simply detuning the coupling circuits to a frequency $f_0$ different from the source frequency $f_1$. Referring to the typical amplifier characteristics shown in Figs. 2A and 2B, a curve 40 having a configuration determined by the amplifier gain characteristics is plotted to represent variations in feedback loop gain $G_L$ as a function of frequency. Curve 41, on the other hand, is plotted to represent the amplifier phase shift $\theta$ as a function of frequency. While at the center frequency $f_0$ to which amplifier 35 is tuned the phase shift is zero, at the frequency $f_1$ of the A.C. source 20, a positive phase shift $\theta$ of 65° is obtained. By simply detuning the amplifier to the lower frequency $f_0$ then, the phase shift $\theta$ for the amplifier 35 is fixed at the desired value. Preferably, the amplifier 35 has a reasonable phase stability such as 2° which, in a practical case, suffices for reasonable accuracy of resistivity measurements.

The flow of survey current to a remote ground return point creates in the vicinity of measuring electrodes $M_1, M_1'$ a potential with respect to a remote reference point which is the normal signal $e_{ns}$ due to the survey current. A normal signal $e_{na}$ is similarly produced by the auxiliary current. These normal signals may be picked up by electrodes $M_1, M_2$, for example, as potentials with respect to a remote reference electrode N insulated a distance up the cable from the housing. To detect the vector sum or resultant of these normal signals, the input circuit of an amplifier 44 is connected by conductors 36 and 45, respectively, to electrodes $M_1$ and N. An amplified version of the resultant normal signal $e_n$ is applied by amplifier 44 to a phase-sensitive detector 47 which may be of any suitable design. To polarize the phase-sensitive detector 47 at a phase angle $\phi$, the potential across the secondary winding of transformer 25 is applied to a phase shifting circuit 48 from which is derived a reference signal at the phase angle $\phi$. This phase angle $\phi$ is substantially greater than zero but less than 90°, a value of about 45° being preferred. Application of this reference signal to the phase-sensitive detector 47 causes the rectified output of the detector to be proportional to that component of the amplified normal signal $e_n$ which is in phase with the reference signal at phase angle $\phi$. This component at the polarization angle $\phi$ is termed the measure signal $e_R$. In rectified form, measure signal $e_R$ is supplied to an indicating device 50 via cable conductor 51 and the phantom ground return circuit. Conveniently, the indicating device 50 is a galvanometric recorder of the type commonly employed in well logging and affording a log of resistivity values correlated with the depth of the electrode array in the borehole.

In operation, the electrode array 13 together with housing 26 is moved through the borehole while survey current and auxiliary current are passed, respectively, from the main and auxiliary electrodes into the adjacent formations. Passage of survey current from the main electrode $A_0$ produces a potential difference between the measuring electrodes $M_1, M_1'$ (or $M_2, M_2'$) which is the inverse signal $e_{is}$ represented by a vector in Fig. 3 extending at the reference phase angle of the survey current vector $i_s$. In response to the potential difference between the measuring electrodes but at a phase angle $\theta$ with respect to that potential difference, auxiliary current $i_a$ is passed by amplifier 35 from the auxiliary electrode $A_1, A_2$. Emission of auxiliary current $i_a$ from the auxiliary electrode $A_1, A_2$ produces a potential difference between measuring electrodes $M_1, M_1'$ (or $M_2, M_2'$) which is the inverse signal $e_{ia}$. Since the auxiliary current is emitted on the opposite side of the pair of measuring electrodes from the survey current, the vector representing the inverse signal $e_{ia}$ is shown in Fig. 3 to be in phase opposition to the auxiliary current $i_a$. As illustrated by the dashed lines, the vector sum of the inverse signal $e_{ia}$ and $e_{is}$ due respectively to the survey and auxiliary currents is the resultant inverse signal $e_i$ which lags the auxiliary current $i_a$ by the phase angle $\theta$. It may be observed that the resultant inverse signal $e_i$ is substantially in phase quadrature with respect to the measure signal $e_R$ and consequently has no more than a slight component at the polarization phase angle $\phi$. As its magnitude need not be maintained at substantially zero, however, a favorable signal-to-noise ratio is obtained and the gain requirements of amplifier 35 are reduced.

The survey and auxiliary currents $i_s$ and $i_a$ produce corresponding potential differences between the measuring electrode $M_1$ and the remote reference electrode N which are the normal signals $e_{ns}$ and $e_{na}$, respectively. As seen in Fig. 3, the vector sum of the normal signal $e_{ns}$ in phase with the survey current and the normal signal $e_{na}$ in phase with the auxiliary current is a resultant normal signal $e_n$ at a phase angle intermediate the phase angles of the survey and auxiliary currents. The component of the resultant normal signal $e_n$ which is at the polarization phase angle $\phi$ is the measure signal $e_R$. While the amplifier 44 supplies an amplified version of the entire resultant normal signal $e_n$ to the phase-sensitive detector 47, the detector 47 is polarized at phase angle $\phi$ to develop a rectified version of only the measure signal component $e_R$. This measure signal $e_R$ is taken to represent the resistivity of formations opposite the main electrode $A_0$. Accordingly, the rectified version of the measure signal is supplied to indicating device 50 to obtain indications of formation resistivity, conveniently as a function of the depth of electrode $A_0$ in the borehole.

The measure potential $e_R$ is directly proportional to the measured formation resistivity only when the emitted survey current remains substantially constant, as is ensured by the presence of high-valued resistor 28. If the survey current is not regulated, indicating device 50 may, of course, be made responsive to the ratio of the potential $e_R$ and the survey current $i_s$.

Resistivity indications obtained with the apparatus of Fig. 1 have substantially the same basis and significance as resistivity indications obtained with apparatus of the type disclosed in the aforementioned Doll Patent No. 2,712,627. With apparatus according to the present invention, only that component of the resultant inverse signal $e_i$ which is at the polarization phase angle is made substantially zero to yield similarly disposed regions of substantially zero potential gradient at the polarization phase angle. However, since the measure circuit is polarized at the same phase angle, the measure signal $e_R$ represents the potential difference between a remote reference point and a point disposed in a region of zero potential gradient, considering only the potential distribution at the polarization phase angle. Accordingly, indications of formation resistivity obtained by using the polarized measure circuit have the desired significance.

Since the measure signal $e_R$ is dependent upon the normal signal $e_{na}$ produced by the auxiliary current $i_a$, accuracy of the measure signal is dependent upon correct adjustment of the auxiliary current. The correct value of the auxiliary current is that which produces an inverse signal $e_{ia}$ exactly balancing the inverse signal $e_{is}$ at the polarization phase angle. Under any given formation conditions, the inverse signal $e_{ia}$ is proportional to the auxiliary current. Hence, a given error in the balance of the inverse signal components at the polarization phase angle, such as plus or minus 5%, results in a like error in the measure signal. In practice, circuit stability requirements preclude such a high gain G for amplifier 35 that balance is secured by reducing the resultant inverse signal $e_i$ exactly to zero. The phase shift $\theta$ of amplifier 35 may, however, be selected in accordance with the principles of this invention to satisfy practical requirements of accuracy.

Figure 4:
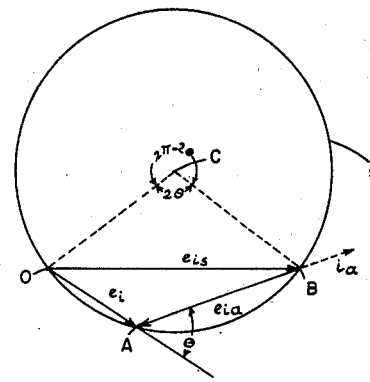
Fig. 4 is a geometrical diagram to aid in understanding the phase relationships.
Figure 5:
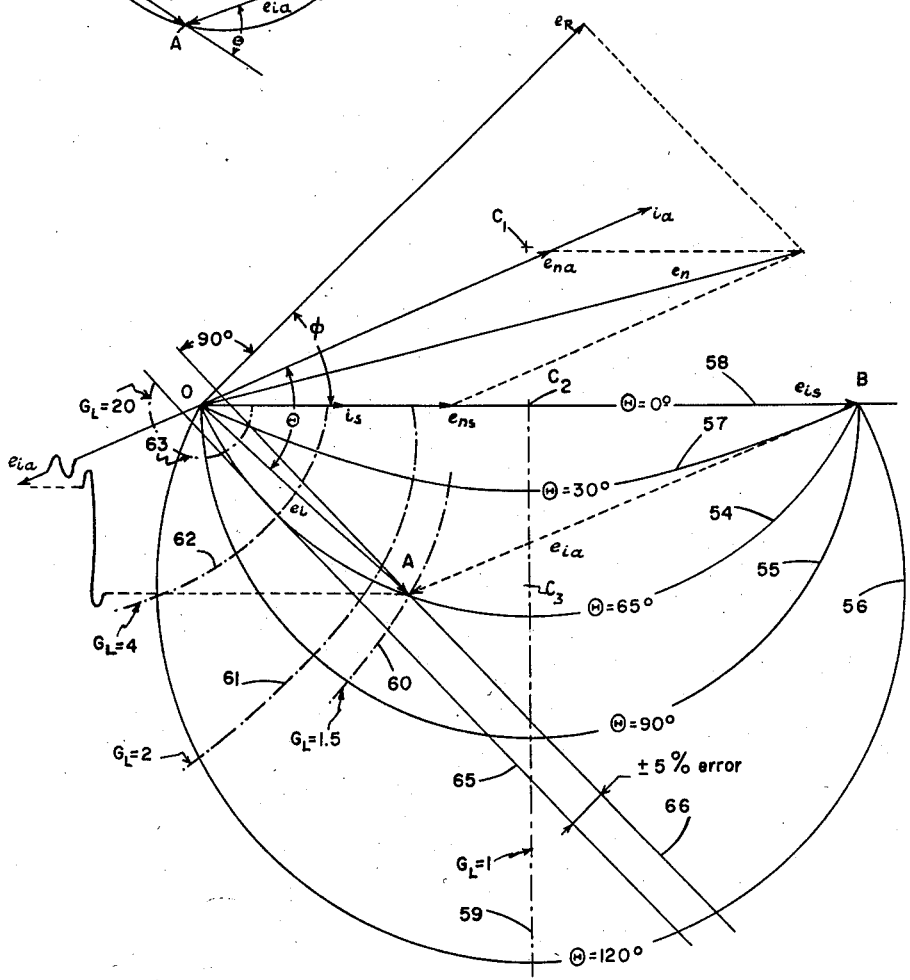
Fig. 5 is a vector diagram utilized in determining the optimum phase relationships for the system of Fig. 1.

Graphically, the relationships between the phase angles $\phi$ and $\theta$ and the permissible error are illustrated in Fig. 5. To better understand the significance of Fig. 5, however, reference is first made to Fig. 4 in which the vectors $e_{is}$ and $e_{ia}$ are shown to have the resultant $e_i$. Under any given formation conditions, the vector $e_{is}$ has a fixed value related to the fixed value of the survey current. The vector $e_{ia}$ has a value proportional to the auxiliary current $i_a$ which is in turn proportional to the value of the resultant inverse signal $e_i$ in accordance with the gain G of the amplifier 35. A circle 54 having a center C is drawn through the terminal points O, A, and B for the vectors. Recognizing that the angle between the vectors $e_{ia}$ and $e_i$ is the phase angle $\theta$, it follows from a well-known geometrical theorem that the angle will remain at the value $\theta$ so long as the point A at which the vectors $e_{ia}$ and $e_i$ terminate remains on the circle 54. Stated another way, so long as the phase angle $\theta$ of the amplifier 35 remains constant, the vector $e_{ia}$ representing the inverse signal due to the auxiliary current and the vector $e_i$ representing the resultant inverse signal will terminate at a point A on a given circle drawn through the points O and B at which the vector $e_{is}$ terminates. It also may be demonstrated that the rays CO and CB subtend an angle $2\theta$.

Considering the circuit in Fig. 1 which extends from the measuring electrodes $M_1$, $M_1'$ via conductors 36, 37 through amplifier 35 and returns via conductor 17 to the auxiliary electrode $A_1$, $A_2$ as a degenerative feedback loop, the loop gain $G_L$ is equal to the ratio of the inverse signal $e_{ia}$ produced by the auxiliary current and the resultant inverse signal $e_i$ which energizes the amplifier 35 to produce the auxiliary current. This loop gain $G_L$ is equal to the product of the gain G of amplifier 35 and the effective gain between the electrodes $A_1$, $A_2$ and the measuring electrodes $M_1$, $M_1'$. This effective gain is dependent upon formation conditions and is known to vary over an exceedingly wide range, for example, over a range of two thousand to one. Hence, the ratio between the vectors $e_{ia}$ and $e_i$ may likewise vary over a wide range, thus shifting the position of the point A on the circle 54. By setting the gain G of the amplifier 35 at a sufficiently high value, the loop gain $G_L$ may be maintained always above some desired value such as 1.5.

Referring now to Fig. 5, the vectors represented in Fig. 3 are reproduced and are shown in relation to portions of circles corresponding to various values of the phase angle $\theta$. Thus, there are shown representative circular segments 54—58 corresponding, in order, to values of $\theta$ which are 65°, 90°, 120°, 30° and 0°. The centers of circles 54, 55 and 56 are indicated at points $C_1$, $C_2$ and $C_3$, respectively. A line 59 is drawn as the perpendicular bisector of the vector $e_{is}$ and represents the locus of the terminal point A on the various circles when the loop gain $G_L$ equals unity ($e_i = e_{ia}$). Curved line 60 similarly represents the locus for a loop gain $G_L$ of 1.5. Succeeding lines 61, 62 and 63 are seen to approach a circular configuration about the point O as the loop gain $G_L$ increases through successive values 2, 4 and 20, respectively.

Assuming that the phase shift in the amplifier 35 is through an angle $\theta$ of 65°, it may be seen from the diagram on Fig. 5 that the resultant inverse signal vector $e_i$ always terminates at a point A lying on or between spaced parallel lines 65, 66 so long as the loop gain $G_L$ exceeds 1.5. These lines 65, 66 are orthogonal to the measure signal vector $e_R$ at phase angle $\theta$. As may be seen more clearly from the portion of the diagram in Fig. 5 which is reproduced in Fig. 6, these lines 65, 66 are spaced equal small distances $\epsilon$ from a parallel line 67 which extends through the point O. Expressing the error more conveniently as a fraction E, its value is given as follows:

$$E = \frac{\epsilon}{e_{is} \cos \phi} \quad (1)$$

the denominator being the value of that component of the vetor $e_{ia}$ when perfect balance is achieved at the polarization phase angle $\theta$. Thus, when the vector $e_{ia}$ terminates at a point A' at which the circle 54 intersects the line 67, the error is zero and the resultant vector $e_i$ is exactly orthogonal to the polarization axis. When the vector $e_{ia}$ terminates at the point A representing the intersection of circle 54 with the line 66, the error has a maximum negative value. Correspondingly, when the vector $e_{ia}$ terminates at point A'', representing the intersection of the circle 54 with the line 65, the error is a maximum positive value.

Referring again to Fig. 5, it may be observed that the bounding lines 65, 66 may be swung about the point O with increasing values of the polarization phase angle $\phi$ until a phase shift angle $\theta$ having the value of 30° would be required to obtain the desired accuracy. For a given fractional error E which may be tolerated, the reduction in phase angle $\theta$ correspondingly reduces the spacing $2\epsilon$ of the lines 65, 66 in accordance with expression (1) above. In consequence, a higher phase stability of the circuitry is required to maintain the resultant vector $e_i$ within the bounding lines 65, 66. Oon theother hand, by reducing the polarization phase angle $\phi$ below the illustrated angle of 45°, the phase shift angle $\theta$ may be increased to 90° or higher with an increase in spread $2\epsilon$ and corresponding reduction in the requirements of phase stability. However, the loop gain $G_L$ may no longer be permitted to fall to the value of 1.5 if the balance of the vectors $e_{is}$ and $e_{ia}$ at the polarization phase angle is to be maintained within a given fractional error E. To maintain the loop gain $G_L$ at a higher value requires that the gain G of amplifier 35 have a proportionately higher value. The higher the value of amplifier gain G, however, the greater the likelihood of instability and oscillations occurring when borehole conditions result in a high loop gain. In consequence, a polarization phase angle $\phi$ of approximately 45° and a phase shift angle $\theta$ of approximately 65° result generally in optimum performance of the apparatus of Fig. 1.

Figure 6:
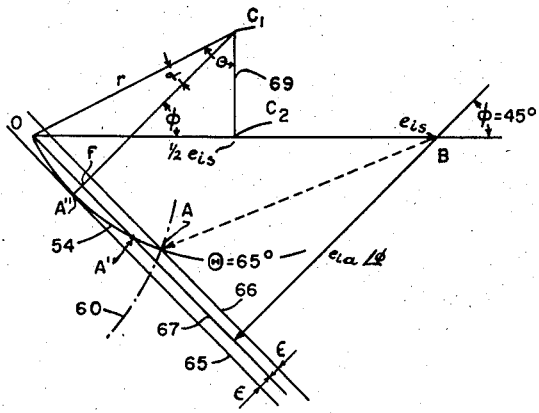
Fig. 6 is a geometrical diagram referred to in deriving mathematically the phase relationships for the system of Fig. 1.

Referring now to Fig. 6, it will be seen that, given the tolerable fractional error E and the value of polarization phase angle $\phi$, the required value of the phase shift angle $\theta$ may be determined graphically. This is accomplished by drawing a vector $e_{is}$ between points O and B of arbitrary length, and drawing from the point O a line 67 at right angles to the polarization axis, spacing parallel lines 65 and 66 from line 67 by the distance $\epsilon$ determined from relationship (1) given above, and then finding the center $C_1$ of the circle which passes through the point O and is tangent to the line 65. The center $C_1$ lies on the perpendicular bisector 69 of the vector $e_{is}$. The angle $\theta$ may then be measured between the line $OC_1$ and the line 69.

As this graphical technique generally requires trial and error to find the tangent point A'', the phase angle $\theta$ may alternatively be found by a mathematical derivation. Considering the triangle $C_1OC_2$, the following expression holds:

$$\sin \theta = \frac{e_{is}}{2r} \quad (2)$$

For the triangle $C_1OF$, the relationship holds:

$$\cos \alpha = \frac{r-\epsilon}{r} \quad (3)$$

where $$\alpha = \theta - 90° + \phi \quad (4)$$

Solving Equations (3) and (4) for $r$, the expression is obtained:

$$r = \frac{\epsilon}{1 - \sin \theta \cos \phi - \cos \theta \sin \phi} \quad (5)$$

Combining expression (5) with expressions (1) and (2), there is obtained a relationship:

$$1 - \sin \theta \cos \phi - \cos \theta \sin \phi = 2E \sin \theta \cos \phi \quad (6)$$

which may be solved for $\theta$ as follows:

$$\theta = \tan^{-1} \frac{\sec \phi}{2\sqrt{E(E+1)}} - \tan^{-1} \frac{\tan \phi}{2E+1} \quad (7)$$

That is to say, the phase angle $\theta$ for the amplifier 35 may be determined, given values of the polarization phase angle $\phi$ and of the fractional error E, such that substantially optimum performance may be obtained.

Figure 7:
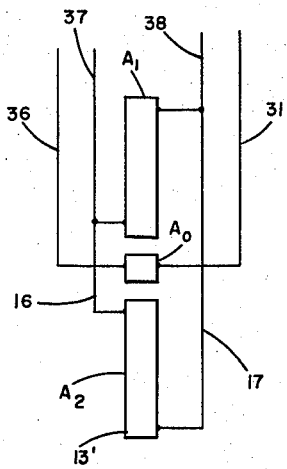
Fig. 7 is a schematic diagram of an electrode array which may be substituted for the array of Fig. 1.

While a particular form of electrode array has been shown with the apparatus of Fig. 1, a variety of electrode arrays may alternatively be employed. Thus, in Fig. 7 there is shown an electrode array 13' which may be employed with the circuitry of Fig. 1 and is of the type disclosed in the aforementioned Doll Patent No. 2,712,628. This electrode array includes a relatively short cylindrical main electrode $A_0$ and, spaced a short distance above and below the main electrode $A_0$, portions $A_1$ and $A_2$ of an auxiliary electrode. These portions are preferably cylindrical in form, having the same diameter as the main electrode $A_0$, and extend for a considerable length above and below the main electrode. The main and auxiliary electrodes serve to pass survey and auxiliary currents into the borehole and to detect potentials produced by such currents at spaced intermediate points.

For suitable connection in the circuitry of Fig. 1, conductor 31 (Fig. 7) connects with the main electrode $A_0$, conductor 17 connects the portions $A_1$ and $A_2$ of the auxiliary electrode, conductor 36 is connected to the main electrode and conductor 37 is connected to the auxiliary electrode $A_1$, $A_2$. The operation of the apparatus of Fig. 1 with the electrode array 13' substituted for array 13 is substantially the same as that described above.

Figure 8:
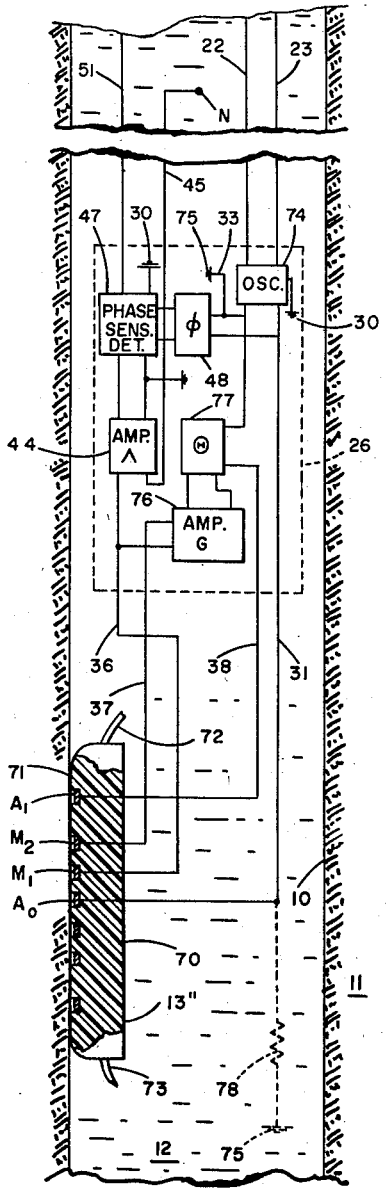
Fig. 8 is a schematic diagram of another well logging system in accordance with the invention. Surface portions of this system, which are identical with corresponding portions of the system of Fig. 1, are omitted for convenience of illustration.

In the embodiment of the invention illustrated in Fig. 8, yet another type of electrode array 13'' is employed, certain changes being made in the circuitry within housing 26. Electrode array 13'' is of the type disclosed in the aforementioned Doll Patent No. 2,712,629 and includes a cushion member 70 having a face 71 urged into conforming, sealing engagement with the borehole wall by means of bowed springs 72, 73, which are shown for convenience in fragmentary form. Inlaid in the face 71 is a central, button-like main electrode $A_0$ and concentric with the main electrode, generally circular measuring electrodes $M_1$, $M_2$ and auxiliary electrode $A_1$ of successively increasing radii. By means of the cushion member, these electrodes are placed in electrical contact with the borehole wall and are effectively insulated from one another and from the drilling fluid 12, except as a conductive path may be provided through the adjacent formations.

To translate electric power from the surface via cable conductors 22, 23 into survey current of a suitable, regulated amplitude and frequency, an oscillator 74 has its input connected to conductors 22, 23 and its output connected to insulated conductors 31 and 33. Because the dimensions of the significant electric field produced in the vicinity of electrode array 13'' are much smaller than those for the electrode array 13, conductor 33 is connected to a remote current return point 75 which may be on a conductive framework supporting cushion member 70.

The inverse signal $e_{is}$ produced as a potential difference between measuring electrodes $M_1$ and $M_2$ by survey current passing from the main electrode $A_0$ is applied via conductors 36, 37 to the input of an amplifier 76 having a relatively high value of gain G. Amplifier 76 may be of any convenient design and, in contrast to amplifier 35 of Fig. 1, preferably has no appreciable phase shift at the frequency of the survey current. The desired phase shift in the feedback loop through phase angle $\theta$ is, instead, produced by a phase shifting circuit 77 of any suitable design connected between the output of amplifier 76 and conductors 33 and 38 in the auxiliary current circuit. Auxiliary current $i_a$ emitted from the auxiliary electrode $A_1$ is, accordingly, shifted in phase through the angle $\theta$ relative to the resultant inverse signal $e_i$ produced as a potential difference between measuring electrodes $M_1$, $M_2$.

The measuring circuit responsive to the resultant normal signal $e_n$ developed as a potential difference between electrode $M_1$ and the remote reference electrode N is just the same as in the apparatus of Fig. 1. That is to say, the measuring circuit is polarized at the phase angle $\phi$ with respect to the reference phase of the survey current and delivers a rectified version of the measure signal $e_R$ via cable conductor 51 to the indicating device 50 at the earth's surface.

The operation of the apparatus in Fig. 8 is substantially the same as that of the apparatus shown in Fig. 1. By employing electrode array 13'' in lieu of electrode array 13, however, the indications of formation resistivity correspond with a shallower depth of investigation. By selecting the phase shift angle $\theta$ in accordance with expression (7) given above and setting the gain G of amplifier 76 sufficiently high to obtain the desired lower limit of loop gain $G_L$, a region of substantially zero potential gradient is produced at the polarization phase angle $\phi$ which defines the bounds of the survey current emitted from electrode $A_0$ and extends from the region between the measuring electrodes $M_1$, $M_2$ transversely of the borehole wall. In consequence, formation resistivity indications may be derived having substantially the same significance and basis as indications derived with apparatus of the type disclosed in Doll Patent No. 2,712,629.

While in general practice a linear scale of resistivity indications is obtained by emitting constant survey current, the advantages of a non-linear scale compressed for higher values of resistivity may be secured by connecting electrode $A_0$ through a shunting resistor 78 (shown in dotted lines) to the remote current return point 75. By suitably selecting a value of resistor 78 in accordance with the teachings of copending application Serial No. 419,762, filed March 30, 1954 by F. P. Kokesh for "Electrical Well Logging," now Patent 2,776,402, granted January 1, 1957, a scale of resistivity indications may be secured which is substantially linear for low resistivity values and extends to infinite formation resistivity at the upper end of the scale.

Various other modifications within the purview of the invention will be apparent to those skilled in the art. For example, unregulated survey current may be emitted from the main electrode $A_0$ and a conventional ratiometer utilized to derive resistivity indications proportional to the ratio of the measure signal $e_R$ to the survey current $i_s$. Portions of the circuitry which are located in the housing 26 may instead be located at the earth's surface. If desired, provision may be made for obtaining other resistivity measurements simultaneously through suitable multiplexing circuits.

While in the several embodiments the auxiliary electrode includes portions spaced above and below the main electrode so that emitted auxiliary current may serve to balance the inverse signals in the vertical direction at the polarization phase angle, it is not necessary that the measuring electrodes include portions spaced above and below the main electrode in every instance. Thus, as disclosed in J. M. Bricaud Patent No. 2,750,557, issued June 12, 1956, for "Electrical Logging of Subterranean Formations," the measuring electrodes may consist of portions or segments spaced horizontally of the main electrode and not vertically. In general, therefore, the inverse signals may be detected at a pair of points, one of which is nearer the main electrode and the other of which is nearer the auxiliary electrode.

The invention, accordingly, is not to be regarded as limited to the specific embodiments disclosed herein, but is defined in the appended claims.

I claim:

1. In apparatus for investigating earth formations traversed by a borehole, the combination comprising a main electrode and an auxiliary electrode including portions spaced above and below said main electrode mounted for movement longitudinally of the borehole, alternating-current electric source means coupled to said main electrode and a current return point for passing survey current into formations adjacent said main electrode, degenerative feedback circuit means including an amplifier having its output coupled to said auxiliary electrode and to a current return point for emitting auxiliary current from said auxiliary electrode, the input of said amplifier being coupled to a pair of points one of which is nearer to said main electrode for response to the potential difference produced therebetween, said feedback circuit means including means for shifting the phase of said auxiliary current by a substantially fixed amount relative to the phase of said potential difference, and means responsive to a potential difference which is produced between a point in the vicinity of said main electrode and a reference point for deriving a signal representing an electrical property of the formations.

2. In apparatus for investigating earth formations traversed by a borehole, the combination comprising a main electrode and an auxiliary electrode including portions spaced above and below said main electrode mounted for movement longitudinally of a borehole, alternating-current electric source means coupled to said main electrode and to a remote current return point for passing survey current into formations adjacent said main electrode, degenerative feedback circuit means including an amplifier having its output coupled to said auxiliary electrode and to a remote current return point for emitting auxiliary current from said auxiliary electrode, the input of said amplifier being coupled to a pair of points one nearer to said main electrode and the other nearer to said auxiliary electrode for response to the potential difference between said pair of points, said feedback circuit means including means for shifting the phase of said auxiliary current by a substantially fixed amount relative to the phase of said potential difference, and means responsive to a potential difference which is produced between a point in the vicinity of said pair of points and a remote reference point for deriving a signal representing formation resistivity.

3. In apparatus for investigating earth formations traversed by a borehole, the combination comprising a main electrode and an auxiliary electrode including portions spaced above and below said main electrode mounted together for movement longitudinally of a borehole, alternating-current electric source means coupled to said main electrode and to a remote current return point for passing survey current into formations adjacent said main electrode, amplifier means responsive to the potential difference between a pair of points one nearer said main electrode and the other nearer said auxiliary electrode for passing auxiliary current from said auxiliary electrode to a remote current return point, said amplifier including means for shifting the phase of said auxiliary current by a phase angle $\theta$ with respect to the phase of said potential difference, said phase angle $\theta$ having a magnitude which is greater than zero but less than 135°, and means responsive to a potential difference at a given phase angle $\phi$ relative to the phase of said survey current which is produced between a point in the vicinity of said pair of points and a remote reference point for deriving a signal representing formation resistivity, said phase angle $\phi$ being substantially greater than zero but less than 90° in magnitude.

4. In apparatus for investigating earth formations traversed by a bore hole, the combination comprising a main electrode, an auxiliary electrode including portions spaced above and below said main electrode, a pair of measuring electrodes spaced intermediate said main and auxiliary electrodes, all of said electrodes being mounted for movement longitudinally of a borehole, alternating-current electric source means coupled to said main electrode and to a remote current return point for passing survey current into formations adjacent said main electrode, an amplifier responsive to the potential difference between said measuring electrodes for passing auxiliary current from said auxiliary electrode to a remote current return point and including means for shifting the phase of said auxiliary current by a given phase angle with respect to the phase of said potential difference, and means responsive to a potential difference of given phase angle relative to the phase of said survey current which is produced between a point in the vicinity of said measuring electrodes and a remote reference point for obtaining indications of formation resistivity.

5. In apparatus for investigating earth formations traversed by a borehole, the combination comprising a main electrode, an auxiliary electrode including elongated portions spaced from and extending above and below said main electrode, said electrodes being mounted together for movement longitudinally of a borehole, alternating-current electric source means coupled to said main electrode and to a remote current return point for passing survey current into formations adjacent said main electrode, an amplifier responsive to the potential difference between said main and auxiliary electrodes for passing auxiliary current from said auxiliary electrode to a remote current return point and including means for shifting the phase of said auxiliary current by a given phase angle with respect to the phase of said potential difference, and means responsive to a potential difference of given phase relative to the phase of said survey current which is produced between said main electrode and a remote reference point for deriving a signal representing formation resistivity.

6. In apparatus for investigating earth formations traversed by a borehole, the combination comprising a cushion member having a face conformable with the borehole wall and adapted for movement through the borehole with its face in sealing contact with the borehole wall, a main electrode, an auxiliary electrode surrounding said main electrode, and a pair of measuring electrodes spaced intermediate said main and auxiliary electrodes, said electrodes being inlaid in the face of said cushion member for electrical contact with the borehole wall, alternating-current electric source means coupled to said main electrode and to a remote current return point for passing survey current into formations adjacent said main electrode, an amplifier responsive to the potential difference between said measuring electrodes for passing auxiliary current from said auxiliary electrode to a remote current return point and including means for shifting the phase of said auxiliary current by a given phase angle with respect to the phase of said potential difference, and means responsive to a potential difference of given phase relative to the phase of said survey current which is produced between a point in the vicinity of said measuring electrodes and a remote reference point for obtaining indications of formation resistivity.

7. In apparatus for investigating earth formations traversed by a borehole, the combination comprising a main electrode, an auxiliary electrode including portions spaced above and below said main electrode, a pair of measuring electrodes spaced intermediate said main and auxiliary electrodes, all of said electrodes being adapted for movement together longitudinally of a borehole, alternating-current electric source means coupled to said main electrode and to a remote current return point for passing survey current into formations adjacent said main electrode at a given frequency, an amplifier having its input connected to said measuring electrodes for response to the potential difference therebetween and its output connected to said auxiliary electrode and to a remote current return point for passing auxiliary current therebetween, said amplifier including means for providing a phase shift of about 65° at the frequency of said survey current, and a phase-sensitive detector polarized at a phase angle of about 45° relative to said survey current and responsive to the potential difference between a point in the vicinity of said measuring electrodes and a remote reference point for deriving a signal representing formation resistivity.

8. In apparatus for investigating earth formations traversed by a borehole, the combination comprising a main electrode, an auxiliary electrode including portions spaced above and below said main electrode, a pair of measuring electrodes spaced intermediate said main and auxiliary electrodes, all of said electrodes being mounted together for movement longitudinally of a borehole, alternating-current electric source means coupled to said main electrode and to a remote current return point for passing survey current into formations adjacent said main electrode, degenerative feedback circuit means including an amplifier having its input coupled to said measure electrodes and its output coupled to said auxiliary electrode and to a remote current return point for passing auxiliary current therebetween, said feedback circuit means including means for shifting the phase of said auxiliary current relative to the phase of the potential difference between said measure electrodes through a phase angle on the order of 65°, and a measuring circuit including a phase-sensitive detector polarized at a phase angle on the order of 45° relative to said survey current and responsive to the potential difference between a point in the vicinity of said measuring electrodes and a remote reference point for deriving a signal representing formation resistivity.

9. In apparatus for investigating earth formations traversed by a borehole, the combination comprising a main electrode and an auxiliary electrode including portions spaced above and below said main electrode mounted together for movement longitudinally of a borehole, alternating-current electric source means coupled to said main electrode and to a remote current return point for passing survey current into formations adjacent said main electrode, a feedback amplifier having its input coupled to a pair of points one nearer said main electrode and the other nearer said auxiliary electrode and responsive to the potential difference between said pair of points for passing auxiliary current between said auxiliary electrode and a remote current return point, said feedback amplifier including means for shifting the phase of said auxiliary current by a phase angle $\theta$ with respect to the phase of said potential difference, and means responsive to a potential difference of given phase angle $\phi$ relative to the phase of said survey current which is produced between a point in the vicinity of said pair of points and a remote reference point for deriving a signal representing formation resistivity, said feedback amplifier having a sufficient gain to balance the inverse signal produced across said pair of points by said survey current with a fractional error no greater than E, the phase shift angle $\theta$ being given by the following expression:

$$\theta = \tan^{-1}\left[\frac{\sec \phi}{2\sqrt{E(E+1)}}\right] - \tan^{-1}\left[\frac{\tan \phi}{2E+1}\right]$$

10. In apparatus for investigating earth formations traversed by a borehole, the combination comprising: a main electrode and an auxiliary electrode mounted for movement through the borehole; means for passing alternating survey current between said main electrode and a current return point; amplifier circuit means responsive to any resulting potential between a location in the vicinity of said main electrode and a reference point for emitting from said auxiliary electrode a value of auxiliary current for maintaining a desired survey current flow pattern, said amplifier circuit means including means for shifting the phase of said auxiliary current by a substantially fixed amount relative to the phase of said resulting potential; and means responsive to the potential difference between a location in the vicinity of said main electrode and a reference point spaced apart therefrom for providing a signal representative of formation resistivity.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,712,629 | Doll | July 5, 1955 |
| 2,712,630 | Doll | July 5, 1955 |
| 2,750,557 | Bricaud | June 12, 1956 |
| 2,776,402 | Kokesh | Jan. 1, 1957 |

UNITED STATES PATENT OFFICE

Certificate of Correction

May 5, 1959

Patent No. 2,885,632

Nick A. Schuster

It is hereby certified that error appears in the printed specification of the above numbered patent requiring correction and that the said Letters Patent should read as corrected below.

Column 6, lines 47 and 59, for "angle $\theta$", each occurrence, read —angle $\phi$—; same column 6, line 58, for "vetor" read —vector—; column 7, line 4, for "Oon theother" read —On the other—.

Signed and sealed this 22nd day of December 1959.

[SEAL]

Attest:
KARL H. AXLINE,
*Attesting Officer.*

ROBERT C. WATSON,
*Commissioner of Patents.*